US007996222B2

(12) United States Patent
Nurminen et al.

(10) Patent No.: US 7,996,222 B2
(45) Date of Patent: Aug. 9, 2011

(54) PROSODY CONVERSION

(75) Inventors: Jani K. Nurminen, Lempäälä (FI); Elina Helander, Tampere (FI)

(73) Assignee: Nokia Corporation, Espoo (FI)

( * ) Notice: Subject to any disclaimer, the term of this patent is extended or adjusted under 35 U.S.C. 154(b) by 1302 days.

(21) Appl. No.: 11/536,701

(22) Filed: Sep. 29, 2006

(65) Prior Publication Data

US 2008/0082333 A1 Apr. 3, 2008

(51) Int. Cl.
*G10L 17/00* (2006.01)

(52) U.S. Cl. ...................... 704/250; 704/200.1; 704/220

(58) Field of Classification Search ........................ None
See application file for complete search history.

(56) References Cited

U.S. PATENT DOCUMENTS

| | | | | |
|---|---|---|---|---|
| 5,878,393 | A * | 3/1999 | Hata et al. | 704/260 |
| 6,260,016 | B1 * | 7/2001 | Holm et al. | 704/260 |
| 6,615,174 | B1 * | 9/2003 | Arslan et al. | 704/270 |
| 6,778,962 | B1 * | 8/2004 | Kasai et al. | 704/266 |
| 6,813,604 | B1 * | 11/2004 | Shih et al. | 704/260 |
| 2003/0028376 | A1 * | 2/2003 | Meron | 704/258 |
| 2005/0144002 | A1 * | 6/2005 | Ps | 704/266 |
| 2005/0182630 | A1 * | 8/2005 | Miro et al. | 704/269 |

FOREIGN PATENT DOCUMENTS

| | | |
|---|---|---|
| WO | 9318505 | 9/1993 |
| WO | 2006053256 | 5/2006 |

OTHER PUBLICATIONS

Rao et al., Prosody modification using instants of significant excitation, May 3, 2006, vol. 14, pp. 972-980.*

Kang, et al., "Applying Pitch Target Model to Convert FO Contour for Expressive Mandarin Speech Synthesis", ICASSP 2006 Proceedings, 2006 IEEE International Conference, vol. 1, pp. I-733-I-736, May 14-19, 2006.

Arslan, et al., "Speaker Transformation Using Sentence HMM Based Alignments and Detailed Prosody Modification", Proceedings of the 1998 IEEE International Conference, vol. 1, pp. 1-5, May 12-15, 1998.

International Search Report and Written Opinion for PCT/IB2007/002690 dated Jul. 3, 2008.

U.S. Appl. No. 11/107,344, filed Apr. 15, 2006, inventors Jani K. Nurminen, Jilei Tian and Imre Kiss.

Arslan, L.M., "Speaker Transformation Algorithm using Segmental Codebooks (STASC)", Speech Communication Journal, vol. 28, pp. 211-226, Jun. 1999.

Stylianou, Y., Cappe, O. and Moulines, E., "Continuous Probabilistic Transform for Voice Conversion", IEEE Proc. on Speech and Audio Processing, vol. 6(2), pp. 131-142, 1998.

(Continued)

*Primary Examiner* — Jakieda R Jackson
(74) *Attorney, Agent, or Firm* — Banner & Witcoff, Ltd.

(57) ABSTRACT

A contour for a syllable (or other speech segment) in a voice undergoing conversion is transformed. The transform of that contour is then used to identify one or more source syllable transforms in a codebook. Information regarding the context and/or linguistic features of the contour being converted can also be compared to similar information in the codebook when identifying an appropriate source transform. Once a codebook source transform is selected, an inverse transformation is performed on a corresponding codebook target transform to yield an output contour. The corresponding codebook target transform represents a target voice version of the same syllable represented by the selected codebook source transform. The output contour may be further processed to improve conversion quality.

31 Claims, 6 Drawing Sheets

OTHER PUBLICATIONS

Verma, A. and Kumar, A., "Voice Fonts for Individuality Representation and Transformation", ACM Trans. on Speech and Language Processing, 2(1), 2005.

Turk., O. and Arslan, L.M., "Voice Conversion Methods for Vocal Tract and Pitch Contour Modification", in Proc. Eurospeech 2003.

D.T. Chapell and J.H. Hansen, "Speaker-specific Pitch Contour Modelling and Modification," in ICASSP, Seattle, May 1998, pp. 885-888.

Z. Inanoglu, "Transforming Pitch in a Voice Conversion Framework," M.S. Thesis, University of Cambridge, Jul. 2003.

B. Gillet and S. King, "Transforming F0 Contours," in Eurospeech, Geneve, Sep. 2003, pp. 101-104.

A. Radford, M. Atkinson, D. Britain, H. Clahsen, and A. Spencer, Linguistics: An Introduction. Cambridge University Press, Cambridge England, pp. 84-101, 1999.

T. Ceyssens, W. Verhelst, and P. Wambacq, "On the Construction of a Pitch Conversion System," in EUSIPCO, Toulouse France, Sep. 2002.

* cited by examiner

80

| CODEBOOK | | | | | | | |
|---|---|---|---|---|---|---|---|
| Index (j) | Feature Vector ($F_j$) | Source Vector ($Z_j^{SRC}$) | Durations ($d_j^{SRC}$, $d\_v_j^{SRC}$) | | Target Vector ($Z_j^{TGT}$) | Durations ($d_j^{TGT}$, $d\_v_j^{TGT}$) | |
| j = 1 | $[F_1(1), F_1(2), \ldots, F_1(M)]$ | $[Z_1^{SRC}(1), Z_1^{SRC}(1), \ldots, Z_1^{SRC}(k)]$ | $d_1^{SRC}$ | $d\_v_1^{SRC}$ | $[Z_1^{TGT}(1), Z_1^{TGT}(1), \ldots, Z_1^{TGT}(k)]$ | $d_1^{TGT}$ | $d\_v_1^{TGT}$ |
| j = 2 | $[F_2(1), F_2(2), \ldots, F_2(M)]$ | $[Z_2^{SRC}(1), Z_2^{SRC}(1), \ldots, Z_2^{SRC}(k)]$ | $d_2^{SRC}$ | $d\_v_2^{SRC}$ | $[Z_2^{TGT}(1), Z_2^{TGT}(1), \ldots, Z_2^{TGT}(k)]$ | $d_2^{TGT}$ | $d\_v_2^{TGT}$ |
| j = 3 | $[F_3(1), F_3(2), \ldots, F_3(M)]$ | $[Z_3^{SRC}(1), Z_3^{SRC}(1), \ldots, Z_3^{SRC}(k)]$ | $d_3^{SRC}$ | $d\_v_3^{SRC}$ | $[Z_3^{TGT}(1), Z_3^{TGT}(1), \ldots, Z_3^{TGT}(k)]$ | $d_3^{TGT}$ | $d\_v_3^{TGT}$ |
| ⋮ | ⋮ | ⋮ | ⋮ | ⋮ | ⋮ | ⋮ | ⋮ |

FIG. 2

PROSODY CONVERSION

FIELD OF THE INVENTION

The invention generally relates to devices and methods for conversion of speech in a first (or source) voice so as to resemble speech in a second (or target) voice.

BACKGROUND OF THE INVENTION

In general, prosody refers to the variation over time of speech elements such as pitch, energy (loudness) and duration. As used herein, "pitch" refers to fundamental frequency (F0). Prosodic components provide a great deal of information in speech. For example, varying duration of pauses between some words or sounds can impart different meanings to those words. Changing the pitch at which certain parts of a word are spoken can change the context of that word and/or indicate excitement or other emotion of the speaker. Variations in loudness can have similar effects. In addition to conveying meaning, prosodic components strongly influence the identity associated with a particular speaker's voice. Unpublished research by the present inventors has shown that people are able to recognize speaker identity based on pure prosodic stimuli (i.e., "beep"-like sounds that were generated using a single sinusoid that followed the evolvement of pitch, energy and durations in recorded speech).

Because prosodic components are important to speaker identification, it is advantageous to modify one or more of these components when performing voice conversion. In general, "voice conversion" refers to techniques for modifying the voice of a first (or source) speaker to sound as though it were the voice of a second (or target) speaker. Existing voice conversion techniques have difficulty converting the prosody of a voice. In many such techniques, the converted speech prosody closely follows the prosody of the source, and only the mean and variance of pitch are altered. Although other techniques have been studied, there remains a need for solutions with better performance.

SUMMARY OF THE INVENTION

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In some embodiments, a codebook is used to convert a source voice to a target voice. In particular, prosody component contours are obtained for the source and for the target using a set of common training material. For each syllable in the training material, a transform is generated for the source voice and for the target voice. The source and target transforms for that syllable are then mapped to one another using a shared codebook index. In some embodiments, additional information regarding the duration, context and/or linguistic features of a training material syllable is also stored in the codebook.

As part of a voice conversion process in at least some embodiments, a contour for a syllable (or other speech segment) in a voice undergoing conversion is first transformed. The transform of that contour is then used to identify one or more source syllable transforms in the codebook. Information regarding the context and/or linguistic features of the contour being converted can also be compared to similar information in the codebook when identifying an appropriate source transform. Once a source transform is selected, an inverse transformation is performed on the corresponding target transform (i.e., the target transform having the same codebook index as the source transform) to yield an output contour. The output contour may then be further processed to improve the conversion quality.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 2 conceptually shows a codebook according to at least some embodiments.

DETAILED DESCRIPTION OF THE PREFERRED EMBODIMENTS

Except with regard to element 27 in FIG. 1 (discussed below), "speaker" is used herein to refer to a human uttering speech (or a recording thereof) or to a text-to-speech (TTS) system. "Speech" refers to verbal communication. Speech is typically (though not exclusively) words, sentences, etc. in a human language.

Figure 1:
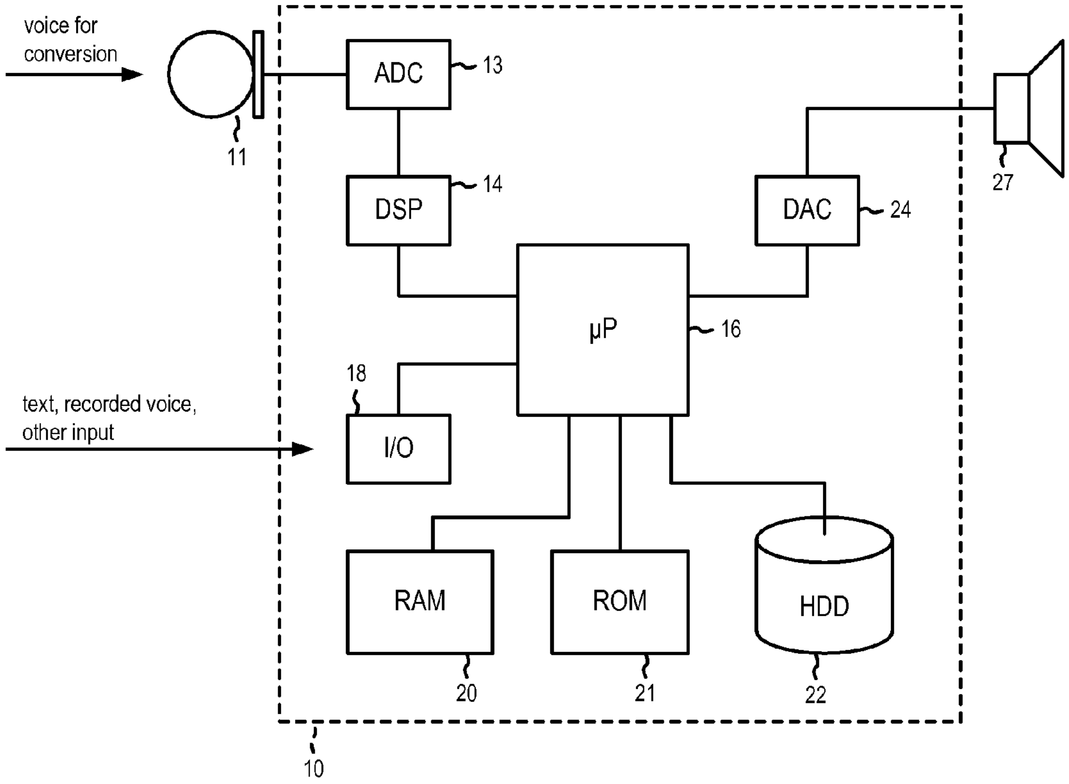
FIG. 1 is a block diagram of a device configured to perform voice conversion according to at least some embodiments.

FIG. 1 is a block diagram of a device 10 configured to perform voice conversion according to at least some embodiments. A microphone 11 receives voice input from a target speaker. Output of microphone 11 is digitized in an analog-to-digital converter (ADC) 13. Digital signal processor (DSP) 14 receives the digitized voice signal from ADC 13, divides the voice data into syllables or other appropriate segments, and generates parameters to model each segment. In at least some embodiments, DSP 14 outputs (for each segment) a series of pitch measurements, a series of energy measurements, information regarding times (durations) between various pitch (and other) measurements, etc. The parameters from DSP 14 are input to microprocessor (μP) 16, which then performs voice conversion using one or more of the methods described in more detail below. In some embodiments, DSP 14 is (or is part of) a conventional coder of a type that outputs F0 data. The operations performed by DSP 14 could alternatively be performed by microprocessor 16 or by another microprocessor (e.g., a general purpose microprocessor).

Device 10 is also configured to generate a converted voice based on input received through an input/output (I/O) port 18. In some cases, that input may be a recording of a source voice. The recording is stored in random access memory (RAM) 20 (and/or magnetic disk drive (HDD) 22) and subsequently routed to DSP 14 by microprocessor 16 for segmentation and parameter generation. Parameters for the recorded voice may then be used by microprocessor 16 to generate a converted voice. Device 10 may also receive text data input through I/O port 18 and store the received text in RAM 20 and/or HDD 22.

Microprocessor 16 is further configured to generate a converted voice based on text input, as is discussed in more detail below.

After conversion in microprocessor 16, a digitized version of a converted voice is processed by digital-to-analog converter 24 and output through speaker 27. Instead of (or prior to) output of the converted voice via DAC 24 and speaker 27, microprocessor 16 may store a digital representation of the converted voice in random access memory (RAM) 20 and/or magnetic disk drive (HDD) 22. In some cases, microprocessor 16 may output a converted voice (through I/O port 18) for transfer to another device. In other cases, microprocessor 16 may further encode the digital representation of a converted voice (e.g., using linear predictive coding (LPC) or other techniques for data compression).

In some embodiments, microprocessor 16 performs voice conversion and other operations based on programming instructions stored in RAM 20, HDD 22, read-only memory (ROM) 21 or elsewhere. Preparing such programming instructions is within the routine ability of persons skilled in the art once such persons are provided with the information contained herein. In yet other embodiments, some or all of the operations performed by microprocessor 16 are hardwired into microprocessor 16 and/or other integrated circuits. In other words, some or all aspects of voice conversion operations can be performed by an application specific integrated circuit (ASIC) having gates and other logic dedicated to the calculations and other operations described herein. The design of an ASIC to include such gates and other logic is similarly within the routine ability of a person skilled in the art if such person is first provided with the information contained herein. In yet other embodiments, some operations are based on execution of stored program instructions and other operations are based on hardwired logic. Various processing and/or storage operations can be performed in a single integrated circuit or divided among multiple integrated circuits ("chips" or a "chip set") in numerous ways.

Device 10 could take many forms. Device 10 could be a dedicated voice conversion device. Alternatively, the above-described elements of device 10 could be components of a desktop computer (e.g., a PC), a mobile communication device (e.g., a cellular telephone, a mobile telephone having wireless internet connectivity, or another type of wireless mobile terminal), a personal digital assistant (PDA), a notebook computer, a video game console, etc. In certain embodiments, some of the elements and features described in connection with FIG. 1 are omitted. For example, a device which only generates a converted voice based on text input may lack a microphone and/or DSP. In still other embodiments, elements and functions described for device 10 are spread across multiple devices (e.g., partial voice conversion is performed by one device and additional conversion by other devices, a voice is converted and compressed for transmission to another device for recording or playback, etc.). In some embodiments, voice conversion may be performed after compression (i.e., the input to the conversion process is compressed speech data).

In at least some embodiments, a codebook is stored in memory and used to convert a passage in a source voice into a target voice version of that same passage. As used herein, "passage" refers to a collection of words, sentences and/or other units of speech (spoken or textual). Segments of the passage in the source voice are used to select data in a source portion of the codebook. For each of the data selected from the codebook source portion, corresponding data from a target portion of the codebook is used to generate pitch profiles of the passage segments in the target voice. Additional processing can then be performed on those generated pitch profiles.

In some embodiments designed for converting the voice of one human speaker to the voice of another human speaker, codebook creation begins with the source and target speakers each reciting the same training material (e.g., 30-60 sentences chosen to be generally representative of a particular language). Pitch analysis is performed on the source and target voice recitations of the training material. Pitch values at certain intervals are obtained and smoothed. The spoken training material from both speakers is also subdivided into smaller segments (e.g., syllables) using phoneme boundaries and linguistic information. If necessary, F0 outliers at syllable boundaries can be removed. For each training material segment, data representing the source voice speaking that segment is mapped to data representing the target voice speaking that same segment. In particular, the source and target speech signals are analyzed to obtain segmentations (e.g., at the phoneme level). Based on this segmentation and on knowledge of which signal pertains to which sentence(s), the different parts of signals that correspond to each other are identified. If necessary, additional alignment can be performed on a finer level (e.g., for 10 millisecond frames instead of phonemes). In other embodiments, the codebook is designed for use with textual source material. For example, such a codebook could be used to artificially generate a target voice version of a typed passage. In some such textual source embodiments, the source version of the training material is not provided by an actual human speaker. Instead, the source "voice" is the data generated by processing a text version of the training material with a text-to-speech (TTS) algorithm. Examples of TTS systems that could be used to generate a source voice for textual training material include (but are not limited to) concatenation-based unit selection synthesizers, diphone-based systems and formant-based TTS systems. The TTS algorithm can output a speech signal for the source text and/or intermediate information at some level between text and a speech signal. The TTS system can output pitch values directly or using some modeled form. The pitch values from the TTS system may correspond directly to the TTS output speech or may be derived from a prosody model.

In some alternate embodiments, dynamic time warping (DTW) can be used to map (based on Mel-frequency Cepstral Coefficients) source speech segments (e.g., 20 millisecond frames) of the codebook training material to target speech segments of the codebook training material.

In the embodiments described herein, speech is segmented at the syllable level. This approach is robust against labeling errors. Moreover, syllables can also be regarded as natural elemental speech units in many languages, as syllables are meaningful units linguistically and prosodically. For example, the tone sequence theory on intonation modeling concentrates on F0 movements on syllables. However, other segmentation schemes could be employed.

In addition to the data representing the source and target voices speaking various segments, the codebook in some embodiments contains linguistic feature data for some or all of the training material segments. This feature data can be used, in a manner discussed below, to search for an optimal source-target data pair in the codebook. Examples of linguistic features and values thereof are given in Table 1.

TABLE 1

| Linguistic feature | Example values |
|---|---|
| Van Santen - Hirschberg classification of syllable coda | UV = unvoiced<br>VS− = voiced without sonorants<br>VS+ = voiced with sonorants |
| Local syllable position | MO = monosyllabic<br>I = initial<br>F = final<br>ME = medial |
| Global syllable position | F = first in phrase<br>L = last in phrase<br>FPP = first in prosodic phrase (predicted using simple punctuation rules)<br>LPP = last in prosodic phrase<br>N = none |
| Lexical stress | S = stress<br>NS = no stress |
| Content or function word | C = content<br>F = function |
| Syllable structure | V = pure vowel<br>VC = vowel followed by consonants<br>CVC = vowel surrounded by consonants<br>CC = consonants without vowel |

All of the above features may not be used in a particular embodiment, and other features could also and/or alternatively be employed. For example, Van Santen-Hirschberg classifications of onset could be used. Linguistic features describing multiple syllables can also be used (e.g., a feature describing the current syllable and/or the next syllable and/or the preceding syllable). Sentence level features (i.e., information about the sentence in which a particular syllable was uttered) could also be used; examples of sentence level features include pitch declination, sentence duration and mean pitch.

FIG. 2 conceptually shows one example 80 of a codebook according to some embodiments. Although represented as a table for ease of explanation, other data storage structures could be employed. The first column of codebook 80 contains indices (j) to the codebook. Each index value j is used to identify codebook entries for a specific training material syllable. Specifically, each index includes entries for a feature vector ($F_j$)(second column), a source vector ($Z_j^{SRC}$)(third column), duration of the source version of the syllable for index j ($d_j^{SRC}$)(first half of the fourth column), duration of the voiced contour of the source version of syllable j ($d\_v_j^{SRC}$) (second half of the fourth column), a target vector ($Z_j^{TGT}$) (fifth column), duration of the target version of syllable j ($d_j^{TGT}$)(first half of the sixth column), and duration of the voiced contour of the target version of syllable j ($d\_v_j^{TGT}$) (second half of the sixth column). The feature vector holds (for each of M features) values for the source voice version of the training material syllable corresponding to a given value for index j. If all the features of Table 1 are used, an example feature vector for the first syllable in the sentence "this is an example" (i.e., the syllable "this") is [UV, MO, F, S, C, CVC]. The source and target vectors for a particular index value contain data representing pitch contours for the source and target versions of the training material syllable corresponding to that index value, and are described in more detail below. The source and target durations for a specific index value represent the total duration of the source and target voice pitch contours for the corresponding training material syllable. The source and target voiced contour durations for a specific index value represent the duration of the voiced portion of source and target voice pitch contours for the corresponding training material syllable.

Figure 3A:
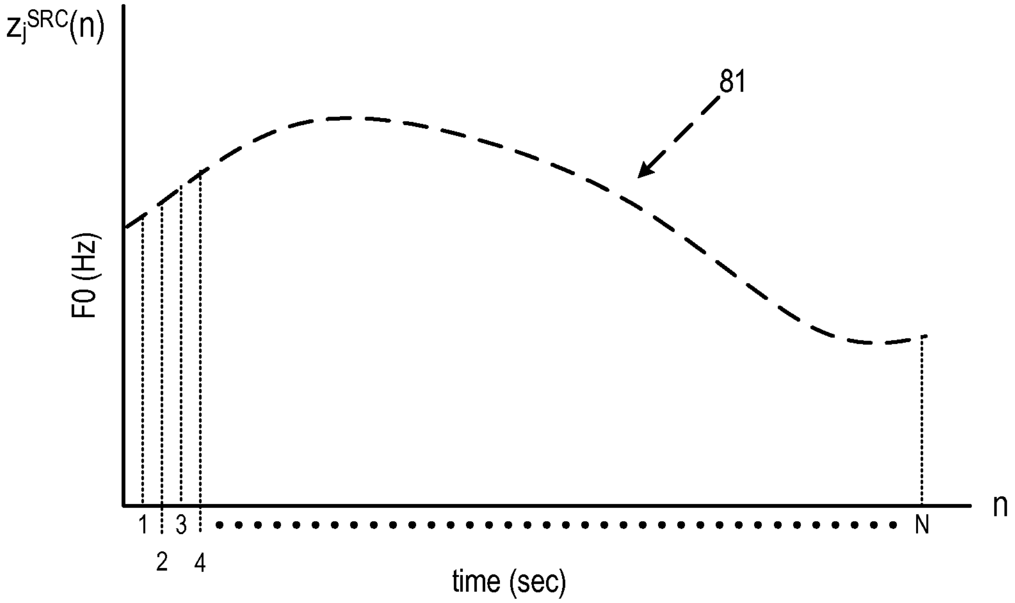
FIGS. 3A and 3B are examples of pitch contours for the same syllable spoken by a source and by a target voice, respectively.
Figure 3B:
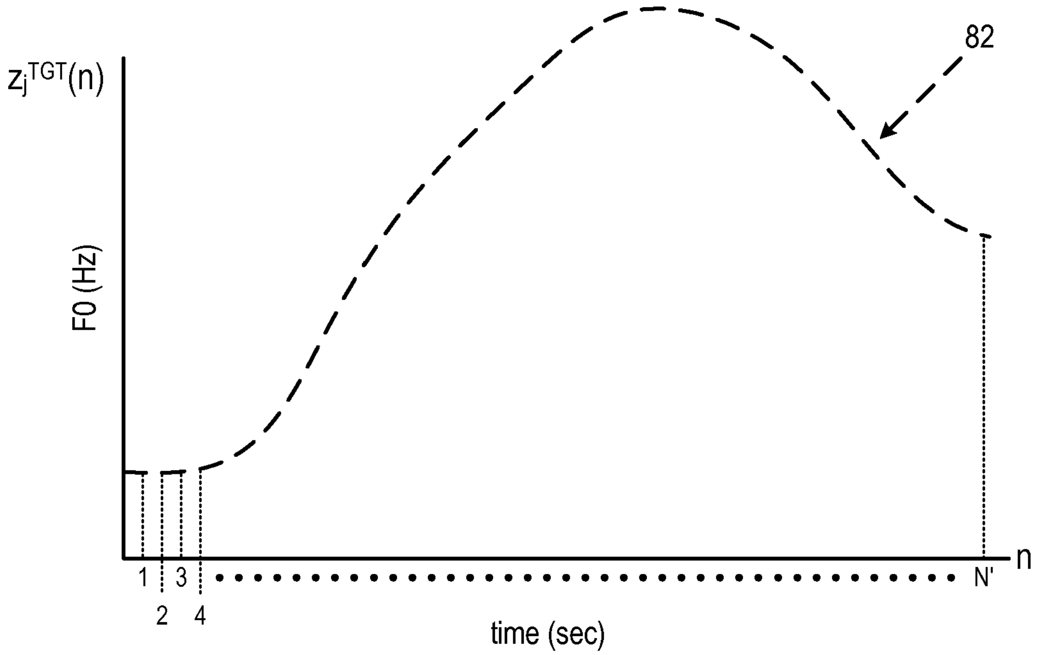

As indicated above, codebook 80 is created using training material that is spoken by source and target voices. The spoken training material is segmented into syllables, and a pitch analysis is performed to generate a pitch contour (a set of pitch values at different times) for each syllable. Pitch analysis can be performed prior to segmentation. Pitch contours can be generated in various manners. In some embodiments, a spectral analysis for input speech (or a TTS analysis of input text) undergoing conversion outputs pitch values (F0) for each syllable. As part of such an analysis, a duration of the analyzed speech (and/or segments thereof) is also provided or is readily calculable from the output. For example, FIG. 3A shows a source pitch contour 81 for syllable j spoken by a source. In the example of FIG. 3A, the contour is for the word "is" spoken by a first speaker. Contour 81 includes values for pitch at each of times n=1 through n=N. The duration of pitch contour 81 (and thus of the source-spoken version of that syllable) is calculable from the number of pitch samples and the known time between samples. As explained in more detail below, a lower-case "z" represents a pitch contour or a value in a pitch contour (e.g., $z_j^{SRC}(n)$ as shown on the vertical axis in FIG. 3A); an upper-case "Z" represents a transform of a pitch contour. FIG. 3B shows a target pitch contour 82 (also shown as $z_j^{TGT}(n)$ on the vertical axis) for the same syllable ("is") as spoken by a second speaker. Target pitch contour 82 also includes values for pitch at each of times n=1 through n=N'. In the examples of FIGS. 3A and 3B, and as will often be the case, N≠N'.

Returning to FIG. 2, the source and target pitch contours for each syllable are stored in codebook 80 using transformed representations. In particular, a discrete cosine transform (DCT) is performed on the pitch values of a source voice pitch contour for a particular training material symbol and stored in codebook 80 as a vector of the DCT coefficients. A source vector $Z_j^{SRC}$ for an arbitrary syllable j is calculated from the source pitch contour $z_j^{SRC}$ according to Equation 1.

$$Z_j^{SRC}(k) = w(k)\sum_{n=1}^{N} z_j^{SRC}(n)\cos\frac{\pi(2n-1)(k-1)}{2N} \qquad \text{Equation 1}$$

where k=1, 2, . . . , N.

N=the number of pitch samples in the pitch contour $z_j^{SRC}$ and $$w(k) = \begin{cases} 1/\sqrt{N}, & k = 1 \\ \sqrt{2/N}, & k = 2, \ldots, N \end{cases}$$

Similarly, a target vector $Z_j^{TGT}$ for syllable j is calculated from the target pitch contour $z_j^{TGT}$ according to Equation 2.

$$Z_j^{TGT}(k) = w(k)\sum_{n=1}^{N} z_j^{TGT}(n)\cos\frac{\pi(2n-1)(k-1)}{2N} \qquad \text{Equation 2}$$

where k=1, 2, . . . , N.

N=the number of pitch samples in the pitch contour $z_j^{TGT}$ and $$w(k) = \begin{cases} 1/\sqrt{N}, & k = 1 \\ \sqrt{2/N}, & k = 2, \ldots, N \end{cases}$$

There are several advantages to storing transformed representations of the training material source and target pitch contour data in codebook 80. Because a transformed representation concentrates most of the information from the pitch contour in the first coefficients, comparisons can be speeded (and/or memory requirements reduced) by only using the first few coefficients when comparing two vectors. As indicated above, pitch contours will often have differing numbers of pitch samples. Even with regard to the same training material syllable, a source speaker may utter that syllable more rapidly or slowly than a target speaker, thereby resulting in contours of different durations (and thus different numbers of pitch samples). When comparing contours of different length, a shorter of two DCT vectors can be zero-padded (or the longer of two DCT vectors can be truncated), but a meaningful comparison still results. Transformed representations also permit generation of a contour, from DCT coefficients of an original contour, having a length different from that of the original contour.

If a set of training material used to generate a codebook is relatively small, the first coefficient for each source and target vector can be omitted (i.e., set to zero). The first coefficient represents a bias value, and there may not be sufficient data from a small training set to meaningfully use the bias values. In certain embodiments, there may not be entries in the codebook for every syllable of the training material. For example, data for syllables having pitch contours with only a few values may not be included.

Figure 4A:
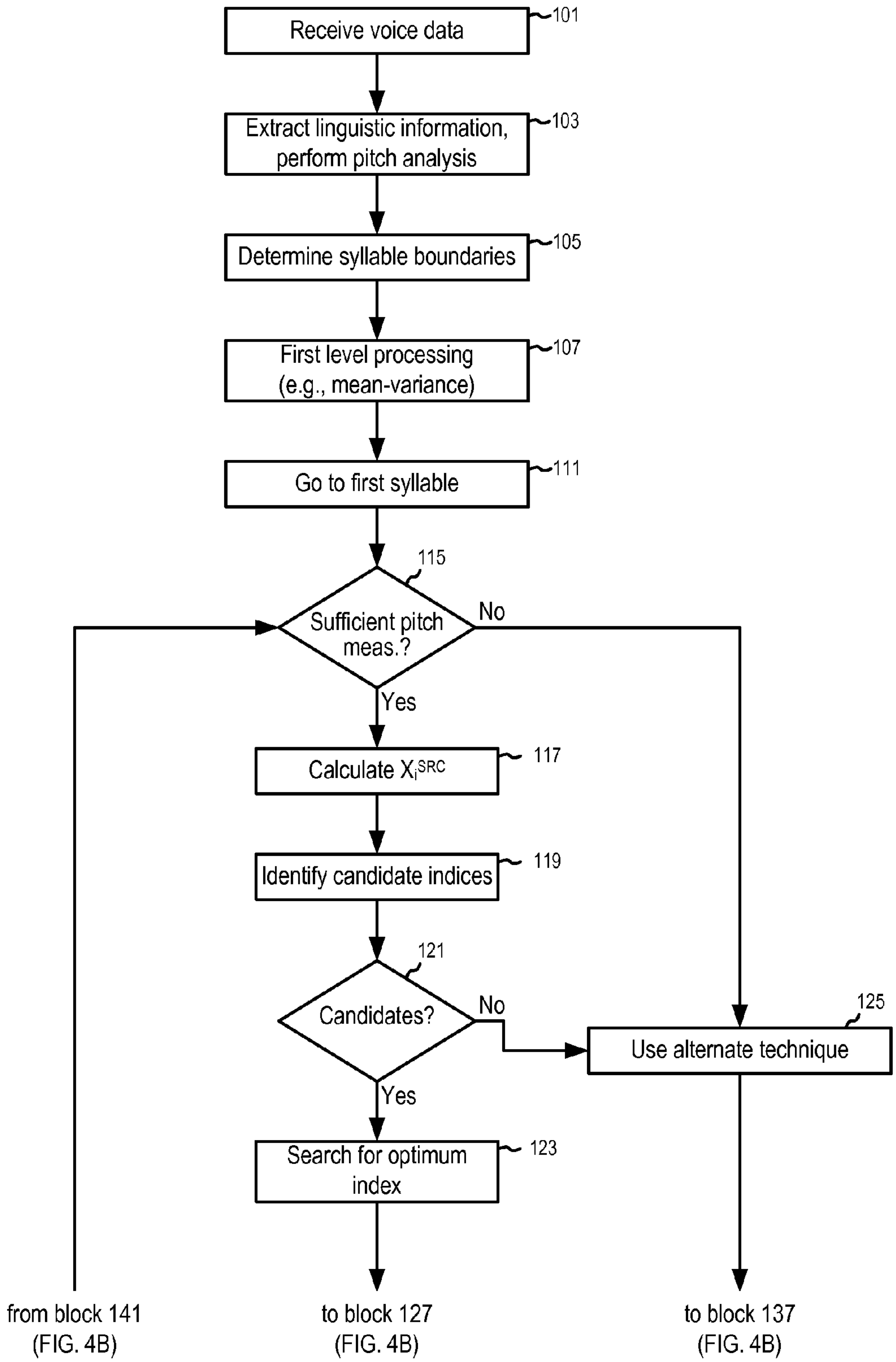
FIGS. 4A and 4B are a flow chart showing a process for voice conversion according to at least some embodiments.
Figure 4B:
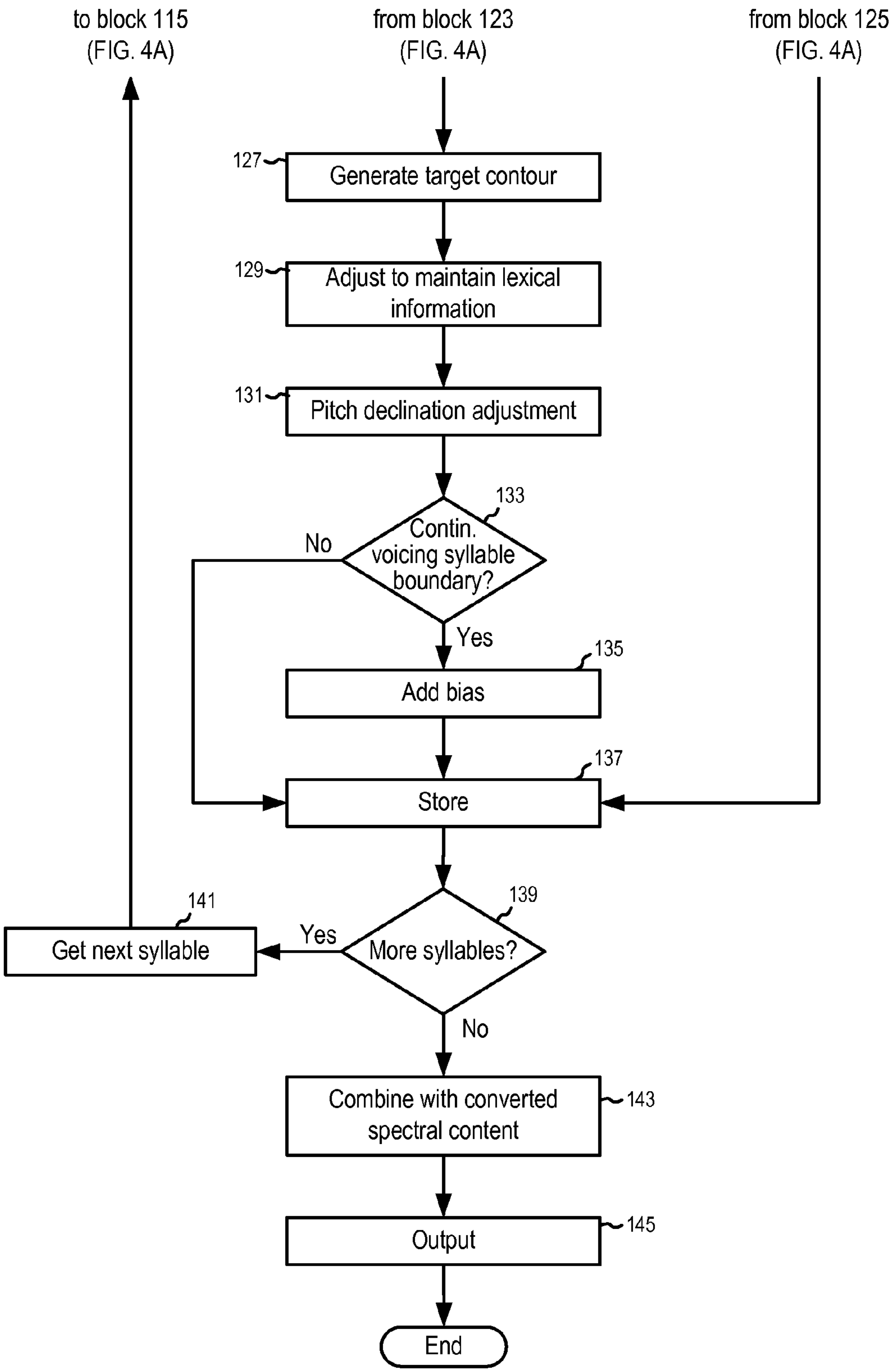

FIGS. 4A and 4B are a block diagram showing a process, according to at least some embodiments and implementing codebook 80 (FIG. 2), for conversion of a source voice passage into a passage in the target voice. The process of FIGS. 4A and 4B assumes that codebook 80 was previously created. The source voice passage may (and typically will) include numerous words that are not included in the training material used to create codebook 80. Although there may be some overlap, the source voice passage and the training material will often be substantially different (e.g., fewer than 50% of the words in the source passage are also in the training material) or completely different (no words in the source passage are in the training material).

For each syllable in the source passage, the process uses source data in codebook 80 to search for the training material syllable for which the corresponding target data will yield a natural sounding contour that could be used in the context of the source passage. As used herein, codebook source data corresponds to codebook target data having the same index (j) (i.e., the source and target data relate to the same training material syllable). As indicated above in connection with FIG. 1, the process shown in FIGS. 4A and 4B can be carried out by one or more microprocessors executing instructions (either stored as programming instructions in a memory or hardwired in one or more integrated circuits).

Beginning in block 101 (FIG. 4A), a source passage is received. The source passage can be received directly from a human speaker (e.g., via microphone 11 of FIG. 1), can be a pre-recorded speech passage, or can be a passage of text for which synthetic voice data is to be generated using TTS conversion.

The process continues to block 103, where linguistic information (e.g., features such as are described in Table 1) is extracted from the source passage. A pitch analysis is also performed on the source passage, and the data smoothed. Data smoothing can be performed using, e.g., low-pass or median filtering. Explicit smoothing may not be needed in some cases, as some pitch extraction techniques use heavy tracking to ensure appropriate smoothness in the resulting pitch contour. If the source passage is actual speech (either live or recorded), DSP 14 (FIG. 1) obtains the pitch information by performing a spectral analysis of the speech. If the source passage is text, pitch information is readily available from the TTS algorithm output. Linguistic information is also readily obtainable for source text based on grammar, syntax and other known elements of the source text language. If the source passage is an actual voice, text corresponding to that voice will typically be available, and can be used to obtain linguistic features.

The process next determines syllable boundaries for the source passage (block 105). For textual source passages, linguistic and phoneme duration from the TTS output is used to detect syllable boundaries. This information is directly available from the TTS process, as the TTS process uses that same information in generating speech for the textual source passage. Alternatively, training data from actual voices used to build the TTS voice could be used. For speech source passages, and as set forth above, a text version of the passage will typically be available for use in segmentation. After identifying syllable boundaries, pitch data from block 103 is segmented according to those syllable boundaries. The segmented pitch data is stored as a separate pitch contour for each of the source passage syllables. A duration ($d_i$) is also calculated and stored for each source passage pitch contour. A duration of the voiced portion of each source passage pitch contour ($d\_v_i$) is also calculated and stored.

First level processing is then performed on the source speech passage in block 107. In particular, and for every syllable of the source speech passage, a mean-variance (MV) version of the syllable pitch contour is calculated and stored. In at least some embodiments, the MV version of each syllable is calculated according to Equation 3.

$$x_i(n)|_{MV} = \frac{x_i^{SRC}(n) - \mu_{SRC}}{\sigma_{SRC}} * \sigma_{TGT} + \mu_{TGT} \quad \text{Equation 3}$$

where $\mu_{SRC}$=mean of all source F0 values for the codebook training material (i.e., mean of all F0 values in the source versions of all codebook training material syllables), $\sigma_{SRC}$=standard deviation of all source F0 values for the codebook training material, $\mu_{TGT}$=mean of all target F0 values for the codebook training material (i.e., mean of all F0 values in the target versions of all codebook training material syllables), $\sigma_{TGT}$=standard deviation of all target F0 values for the codebook training material, $x_i^{SRC}(n)$=a value for F0 at time "n" in the F0 contour for source passage syllable i, and $x_i(n)|_{MV}$=an MV value for F0 at time "n" in the F0 contour for the MV version of source passage syllable i The process then continues to block 111 and flags the pitch contour for the first source passage syllable (i=1) as the source contour undergoing conversion (SCUC). The process then proceeds to block 115 and determines if there are sufficient pitch measurements for the SCUC to permit meaningful use of data from codebook 80. For example, a weakly voiced or (primarily) unvoiced source passage syllable might have only one or two pitch values with an estimation interval of 10 milliseconds, which would not be sufficient for a meaningful contour. If there are insufficient pitch measurements for the SCUC, the process continues along the "No" branch to block 125 and calculates a target voice version of the SCUC using an alternative technique. Additional details of block 125 are provided below.

If there are sufficient pitch measurements for the SCUC, the process continues along the "Yes" branch from block 115 to block 117 to begin a search for an optimal index ($j_{opt}$) in codebook 80 (FIG. 2). In particular, the process searches for the index j having target data that will yield the best (e.g., most natural sounding and convincing) target voice version of the SCUC.

In block 117, a transform vector $X_i^{SRC}$ (upper case X) is calculated for the SCUC according to equation 4.

$$X_i^{SRC}(k) = w(k)\sum_{n=1}^{N} x_i^{SRC}(n)\cos\frac{\pi(2n-1)(k-1)}{2N} \qquad \text{Equation 4}$$

where k=1, 2, . . . , N

N=the number of pitch samples in the pitch contour $x_i^{SRC}$ and $$w(k) = \begin{cases} 1/\sqrt{N}, & k = 1 \\ \sqrt{2/N}, & k = 2, \ldots, N \end{cases}$$

In equation 4, "i" is an index for the SCUC syllable in relation to other syllables in the source passage. The quantity $x_i^{SRC}(n)$ (lower case x) is (as in equation 3) a value for pitch at time interval "n" in the SCUC. The value N in equation 4 can be the same or different than the value of N in equation 1 or equation 2. If N in equation 4 is different than N in equation 1 or equation 2, vector $X_i^{SRC}$ can be adjusted in subsequent computations (e.g., as described below in connection with condition 1) by padding $X_i^{SRC}$ with "0" coefficients for k=N+1, N+2, etc., or by dropping coefficients for k=N, N−1, etc.

In block 119, a group of candidate codebook indices is found by comparing $X_i^{SRC}$ to $Z_j^{SRC}$ for all values of index j. In at least some embodiments, the comparison is based on a predetermined number of DCT coefficients (after the first DCT coefficient) in $x_i^{SRC}$ and in $Z_j^{SRC}$ according to condition 1.

$$\sum_{k=w}^{z}(X_i^{SRC}(k) - Z_j^{SRC}(k)) \le p \qquad \text{Condition 1}$$

The quantity p in condition 1 is a threshold which can be estimated in various ways. One manner of estimating p is described below. Each value of j which results in satisfaction of condition 1 is flagged as a candidate codebook index. The values "w" and "z" in condition 1 are 2 and 10, respectively, in some embodiments. However, other values could be used.

The process then continues to block 121. If in block 119 no candidate indices were found (i.e., condition 1 was not satisfied for any value of index j), the process advances to block 125 along the "no" branch. In block 125, a target voice version of the SCUC is generated using an alternate conversion technique. In at least some embodiments, the alternate technique generates a target voice version of the SCUC using the values for $x_i(n)|_{MV}$ that were stored in block 107. Other techniques can be used, however. For example, Gaussian mixture modeling, sentence level modeling and/or other modeling techniques could be used. From block 125 the process then proceeds to block 137 (FIG. 4B), where the converted version of the SCUC is stored.

If one or more candidate indices were found in block 119, the process then advances from block 121 to block 123. In block 123, an optimal codebook index is identified from among the candidates indices. In at least some embodiments, the optimal index is identified by comparing the durations ($d_i$ and $d\_v_i$) calculated in block 105 to values of $d_j^{SRC}$ and $d\_v_j^{SRC}$ for each candidate index, as well as by comparing linguistic features ($F_j$) associated with the candidate codebook indices to features of the SCUC syllable. In particular, a feature vector $F_i$=[F(1), F(2), . . . , F(M)] is calculated for the SCUC syllable based on the same feature categories used to calculate feature vectors $F_j$. The SCUC feature vector $F_i$ is calculated using linguistic information extracted in block 103 and the syllable boundaries from block 105. An optimal index is then found using a classification and regression tree (CART).

Figure 5:
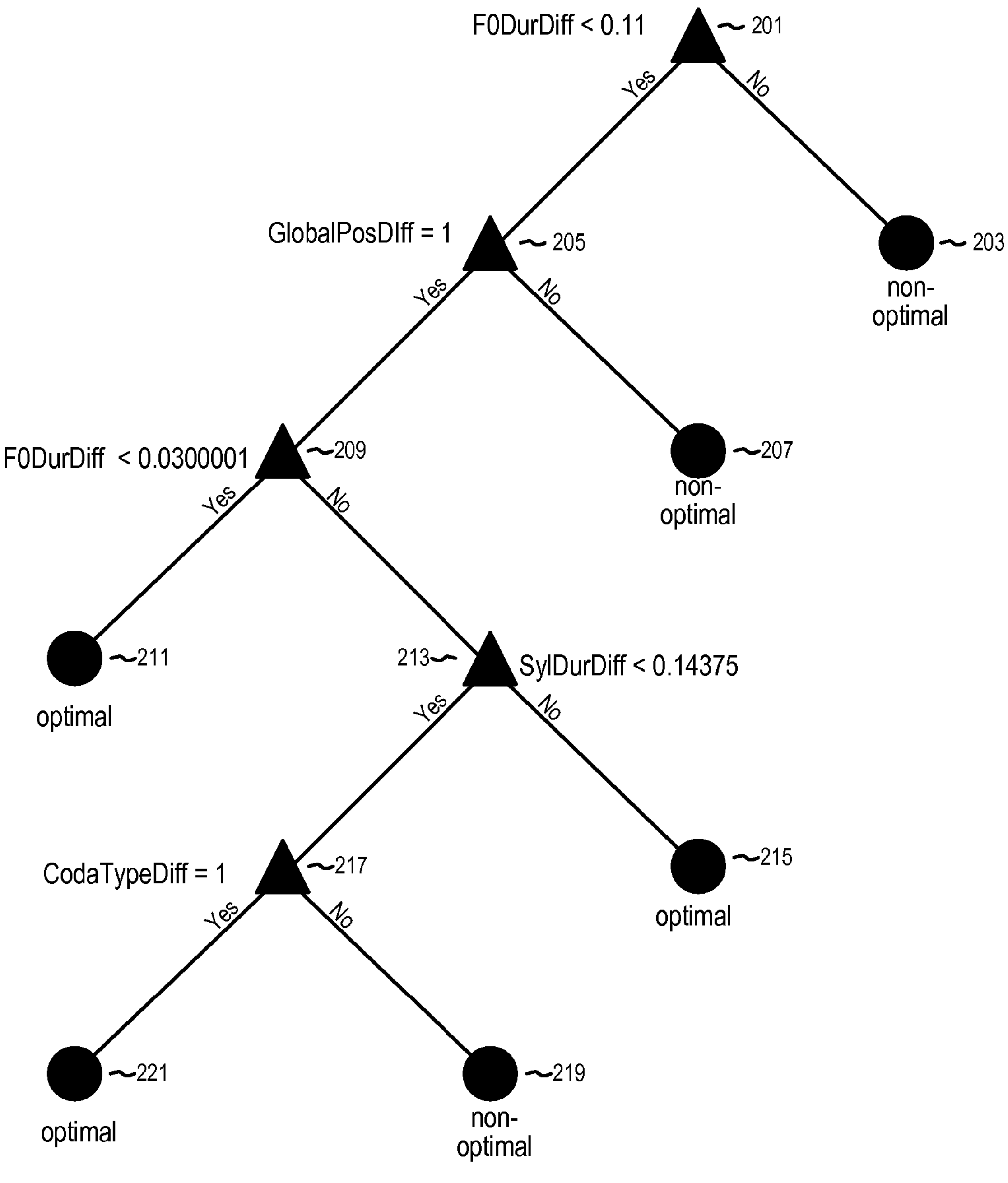
FIG. 5 is an example of a classification and regression tree, used in at least some embodiments, for identification of potentially optimal codebook entries.

One example of such a CART is shown in FIG. 5. The CART of FIG. 5 relies on values of two features from the possible features listed in Table 1: global syllable position and Van Santen-Hirschberg classification of syllable coda. The CART of FIG. 5 also compares values of syllable durations and voiced contour portion durations. Other CARTs used in other embodiments may be arranged differently, may rely upon additional and/or other features, and may not rely on all (or any) durational data. The numerical values in the CART of FIG. 5 are only one example for a particular set of data. Generation of a CART is described below.

Use of the CART begins at decision node 201 with the first candidate index identified in block 119 (FIG. 4A). If the absolute value of the difference (F0DurDiff) between the value of voiced contour portion duration ($d\_v_j^{SRC}$) for the first candidate index and the value of voiced contour portion duration for the SCUC ($d\_v_i$) is not less than 0.11 milliseconds, the "No" branch is followed to leaf node 203, and the first candidate index is marked non-optimal. Evaluation of the next candidate (if any) would then begin at node 201. If the value for F0DurDiff is less than 0.11 milliseconds, the candidate index is potentially optimal, and the "Yes" branch is followed to decision node 205, where the values for the global syllable position feature of the SCUC syllable and of the candidate index are compared. If the values are the same, the difference between those values (GlobalPosDiff) is "1." Otherwise the value for GlobalPosDiff is "0". If GlobalPosDiff=0, the "No" branch is followed to leaf node 207, and the first candidate index is marked non-optimal. Evaluation of the next candidate (if any) would then begin at node 201. If the value for GlobalPosDiff is 1, the candidate index is potentially optimal, and the "Yes" branch is followed to decision node 209.

In node 209, the value for F0DurDiff (calculated at decision node 201) is again checked. If F0DurDiff is less than 0.0300001 milliseconds, the "Yes" branch is followed, and the candidate is marked as optimal. If F0DurDiff is not less than 0.0300001 milliseconds, the "No" branch is followed to decision node 213. At node 213, the absolute value of the difference between the SCUC syllable duration ($d_i$) and the duration of the source syllable for the candidate index ($d_j^{SRC}$) is calculated. If that difference ("SylDurDiff") is not less than 0.14375 milliseconds, the "No" branch is followed to leaf node 215, where the candidate is marked non-optimal. The next candidate index is then used to begin (at node 201) a second pass through the CART.

If the value of SylDurDiff at decision node 213 is less than 0.14375 milliseconds, the yes branch is followed to decision node 217. In node 217 the values for the Van Santen-Hirschberg classification of syllable coda feature of the SCUC syllable and of the candidate index source syllable are compared. If the values are the same, the difference between those values ("CodaTypeDiff") is "1." Otherwise the value for CodaTypeDiff is "0". If CodaTypeDiff=0, the "No" branch is followed to leaf node 219, where the candidate is marked non-optimal. The next candidate index is then used to begin (at node 201) a second pass through the CART. If the value for CodaTypeDiff is 1, the "Yes" branch is followed to leaf node 221, and the index is marked as optimal.

All of the candidate indices from block 119 of FIG. 4A are evaluated against the SCUC in block 123 using a CART. In some cases, there can be multiple candidate indices that are marked optimal, while in other cases may be no candidate indices marked optimal. If multiple candidate indices are marked optimal after evaluation in the CART, a final selection from among the optimal candidates can be based on which of the optimal candidates has the smallest difference with regard to the SCUC. In particular, the candidate having the smallest value for $$\sum_{k=w}^{z} (X_i^{SRC}(k) - Z_j^{SRC}(k))$$

(i.e., the left side of condition 1) is chosen. If no candidate is marked optimal after evaluation in the CART, then the candidate that progressed to the least "non-optimal" leaf node is chosen. In particular, each leaf node in the CART is labeled as "optimal" or "non-optimal" based on a probability (e.g., 50%) of whether a candidate reaching that leaf node will be a candidate corresponding to a codebook target profile that will yield a natural sounding contour that could be used in the context of the source passage. The candidate reaching the non-optimal leaf node with the highest probability (e.g., one that may have a probability of 40%) is selected. If no candidates reached an optimal leaf node and more than one candidate reached the non-optimal leaf node with the highest priority, the final selection from those candidates is made based on the candidate having the smallest value for the left side of condition 1.

In at least some alternate embodiments, an index is chosen in block 123 according to equation 5.

$$j_{opt} = \underset{j}{\operatorname{argmin}} \sum_{m=1}^{M} C(m) * W(m) \qquad \text{Equation 5}$$

The quantity "C(m)" in equation 5 is the $m^{th}$ member of a cost vector C that is calculated between $F_j$ and $F_i$. If $F_i$=[$F_i$(1),$F_i$(2), . . . , $F_i$(M)] and $F_j$=[$F_j$(1),$F_j$(2), . . . , $F_j$(M)], cost vector C=[{Diff($F_i$(1),$F_j$(1)}, {Diff($F_i$(1),$F_j$(1)} . . . , {Diff($F_i$(M),$F_j$(M)}].

For a linguistic feature, the difference between values of a feature can be set to one if there is a perfect match or to zero if there is no match. For example, assume the feature corresponding to $F_i$(1) and to $F_j$(1) is Van Santen-Hirschberg classification (see Table 1). Further assume that the classification for the syllable associated with the SCUC is "UV" ($F_i$(1)=UV) and that the classification for the training material syllable associated with index j is "VS-" ($F_j$(1)=VS-). In such a case, {Diff($F_i$(1),$F_j$(1)}=1. In alternate embodiments, non-binary cost values can be used. The quantity "W(m)" in equation 5 is a weight for the $m^{th}$ feature. Calculation of a weight vector W=[W(1), W(2), . . . , W(M)] is described below.

The process advances from block 123 (FIG. 4A) to block 127 (FIG. 4B). In block 127, a target contour is generated based on the target DCT vector ($Z_j^{TGT}$) corresponding to the value of index j selected in block 123. In at least some embodiments, F0 values for the target contour ($x_i^{TGT}(n)$) are calculated according to equation 6.

$$x_i^{TGT}(n) = \sum_{k=1}^{x} w(k) Z_j^{TGT}(k) \cos\frac{\pi(2n-1)(k-1)}{2N} \qquad \text{Equation 6}$$

where n=1, 2, . . . , N,

N=number of DCT coefficients in $Z_j^{TGT}$ (and thus number of pitch measurements for the target voice version of training material syllable corresponding to index j selected in block 123), and $$w(k) = \begin{cases} 1/\sqrt{N}, & k = 1 \\ \sqrt{2/N}, & k = 2, \ldots, N \end{cases}$$

In equation 6, the first DCT coefficient is set to zero ($Z_j^{TGT}(1)=0$) so as to obtain a zero-mean contour. If a resulting contour having a length different than that of the target version of the codebook syllable for which for which $Z_j^{TGT}$ is used in equation 6 is desired, $Z_j^{TGT}$ can be padded with 0 coefficients (or some coefficients dropped).

The process then continues to block 129, where the output from block 127 is further adjusted so as to better maintain lexical information of the source passage syllable associated with the SCUC. F0 values in the adjusted contour ($x_i^{TGT}(n)|_a$) are calculated according to equation 7.

$$x_i^{TGT}(n)|_a = x_i^{TGT}(n) + x_i^{SRC}(n) - z_j^{SRC}(n) \qquad \text{Equation 7}$$

In equation 6, "$x_i^{SRC}$" is the source pattern (i.e., the SCUC) and "$z_j^{SRC}$" is the pitch contour for the source version of the syllable corresponding to the key selected in block 123 (i.e., the inverse DCT transformed $Z_j^{SRC}$).

The process then continues to block 131, where the output of block 129 is adjusted in order to predict target sentence pitch declination. F0 values for the adjusted contour ($x_i^{TGT}(n)|_{a,\mu}$) are calculated according to equation 8.

$$x_i^{TGT}(n)|_{a,\mu} = x_i^{TGT}(n)|_a + x_i(n)|_{MV} \qquad \text{Equation 8}$$

The quantity "$x_i(n)|_{MV}$" in equation 8 is described above in connection with equation 3. Adjusting for pitch declination using the mean value helps to avoid large errors than can result using a declination slope mapping approach.

Next, the process determines in block 133 if the boundary between the source passage syllable corresponding to the SCUC and the preceding source passage syllable is continuous in voicing. If not, the process skips to block 137 (described below) along the "No" branch. As can be appreciated, the result in block 133 would be "no" for the first syllable of a passage. As to subsequent passage syllables, the result may be "yes", in which case the process further adjusts $x_i^{TGT}(n)|_{a,\mu}$ (from block 131) in block 135 by adding a bias (b) in order to preserve a continuous pitch level. This adjustment is performed using equation 9.

$$x_i^{TGT}(n)|_{a,\mu,c}=x_i^{TGT}(n)|_{a,\mu}+b \quad \text{Equation 9}$$

where $$b=x_i^{TGT}(N)|_{a,\mu,c}-x_i^{TGT}(1)|_{a,\mu},$$

In equation 8, "$x_i^{TGT}(1)|_{a,\mu}$" is the first pitch value in the SCUC after adjustment in block 131 and "$x_{i-1}^{TGT}(N)|_{a,\mu,c}$" is the $N^{th}$ pitch value in the previous SCUC after all adjustments. The pitch levels in a SCUC can be further (or alternatively) adjusted using the mean values obtained in block 107.

In block 137, the final target voice version of the SCUC is stored. The process then determines in block 139 whether there are additional syllables in the source passage awaiting conversion. If so, the process continues on the "yes" branch to block 141, where the next source passage syllable is flagged as the SCUC. The process then returns to block 115 (FIG. 4A) to begin conversion for the new SCUC. If in block 139 the process determines there are no more source passage syllables to be converted to the target voice, the process advances to block 143. (Alternatively, each syllable contour can be given to block 143 directly or through a short buffer to allow the combining and the generation of speech output before finishing all the syllables in the passage.) In block 143, the syllable-length pitch contours stored in passes through block 137 are combined with converted spectral content to produce the final output speech signal. Spectral content of the source passage can be converted to provide a target voice version of that spectral content using any of various known methods. For example, the conversion of the spectral part can be handled using Gaussian mixture model based conversion, hidden Markov model (HMM) based techniques, codebook-based techniques, neural networks, etc. Spectral content conversion is not shown in FIGS. 4A and 4B, as that spectral conversion can be performed (by, e.g., DSP 14 and/or microprocessor 16 of FIG. 1) separately from the process of FIGS. 4A and 4B. However, source passage spectral data can be obtained at the same time as input data used for the process shown in FIGS. 4A and 4B (e.g., in block 103 and using DSP 14 of FIG. 1). The prosodic contours stored during passes through block 137 (which may also include durational modifications, as discussed below) are combined with the converted spectral content by, for example, combining the parametric outputs of the two parts of the conversion. The spectral and prosodic parameters may have some dependencies that should be taken into account in the conversion. For example, when a harmonic model is used for the spectral content, the spectral harmonics should be resampled according to the pitch values that come from the prosodic conversion. From block 143, the process advances to block 145 and outputs the converted speech. The output may be to DAC 24 and speaker 27 (FIG. 1), to another memory location for longer term storage (e.g., transfer from RAM 20 to HDD 22), to another device via I/O port 18, etc. After output in block 145, the process ends.

As indicated above, at least some embodiments utilize a classification and regression tree (CART) when identifying potentially optimal candidates in block 121 of FIG. 4A. In some such embodiments, the CART (such as that shown in FIG. 5) is created in the following manner. First, similarity matrices A and B are created from the source and target vectors in the codebook. Each element $a_{gh}$ of matrix A is found with equation 10 using the first Q members of each source vector $Z_j^{SRC}$, and with $Z_j^{SRC}(1)=0$ for every source vector.

$$a_{gh}=\sum_{q=1}^{Q}(Z_h^{SRC}(q)-\alpha_{gh}Z_g^{SRC}(q)) \quad \text{Equation 10}$$

where g,h=1, 2, . . . , K

K=number of syllables in codebook $Z_g^{SRC}(q)$ is the $q^{th}$ member of $Z_j^{SRC}$ for j=g $Z_h^{SRC}(q)$ is the $q^{th}$ member of $Z_j^{SRC}$ for j=h $$\alpha_{gh}=\sqrt{\frac{N_g}{N_h}},$$

a scaling factor resulting from zero-padding or truncating a DCT domain vector calculated for a sequence of length $N_h$ to length $N_g$.

Similarly, each element $b_{gh}$ of matrix B is found with equation 11 using the first Q members of each target vector $Z_j^{TGT}$, and with $Z_j^{TGT}(1)=0$ for every target vector.

$$b_{gh}=\sum_{q=1}^{Q}(Z_h^{TGT}(q)-\alpha_{gh}Z_g^{TGT}(q)) \quad \text{Equation 11}$$

where g,h=1, 2, . . . , K

K=number of syllables in codebook $Z_g^{TGT}(q)$ is the $q^{th}$ member of $Z_j^{TGT}$ for j=g $Z_h^{TGT}(q)$ is the $q^{th}$ member of $Z_j^{TGT}$ for j=h $$\alpha_{gh}=\sqrt{\frac{N_g}{N_h}},$$

a scaling factor resulting from zero-padding or truncating a DCT domain vector calculated for a sequence of length $N_h$ to length $N_g$.

Matrices A and B each has zeros as diagonal values.

During a separate training procedure performed after creation of codebook 80, a CART can be built to predict a group of pre-selected candidates which could be the best alternative in terms of linguistic and durational similarity to the SCUC. The CART training data is obtained from codebook 80 by sequentially using every source vector in the codebook as a CART-training SCUC (CT-SCUC). For example, assume the first source vector contour in codebook 80 is the current CT-SCUC. Values in matrix A from $a_{12}$ to $a_{1k}$ are searched. If a value $a_{1j}$ is below a threshold, i.e., $a_{1j}<\delta_1$ (the threshold determination is described below), codebook index j is considered a potential candidate. For all candidates the corresponding value $b_{1j}$ from matrix B is obtained. Based on the value of $b_{1j}$, index j is considered an optimal CART training sample if $b_{1j}$ is below a threshold $\delta_0$, a nonoptimal CART training sample if $b_{1j}$ is higher than a threshold $\delta_n$, and is otherwise considered a neutral CART training sample. This procedure is then repeated for every other codebook source vector acting as the CT-SCUC.

Neutral samples are not used in the CART training since they fall into a questionable region. The source feature vector values associated with the optimal and the non-optimal CART training samples are matched with the feature vectors of the CT-SCUC used to find those optimal and the non-optimal CART training samples, resulting in a binary vector. In the binary vector, each one means that there was a match in the feature (for example 1 if both are monosyllabic), and zero if the corresponding features were not the same. The absolute duration difference between each CT-SCUC source version syllable duration and the source syllable durations of the CART optimal and nonoptimal training samples found with that CT-SCUC are stored, as are absolute duration differences between the duration of the voiced part of each CT-SCUC source version syllable and the durations of the voiced parts of the source syllables of the CART optimal and nonoptimal training samples found with that CT-SCUC. Ultimately, a reasonably large number of optimal CART training samples and nonoptimal CART training samples, together with corresponding linguistic and durational information, is obtained.

Values for $\delta_0$ and $\delta_n$ can be selected heuristically based on the data. The threshold $\delta_1$ is made adaptive in such a manner that it depends on the CT-SCUC with which it is being used. It is defined so that a p % deviation from the minimum difference between the closest source contour and the CT-SCUC (e.g., minimum value for $a_{gh}$ when comparing the CT-SCUC with other source contours in the codebook) is allowed. The value p is determined by first computing, for each CT-SCUC in the codebook, (1) the minimum distance (e.g., minimum $a_{gh}$) between the source contour for that CT-SCUC and other source contours in the codebook, and (2) the minimum distance between optimal CART training sample source contours found for that CT-SCUC. Then, for each CT-SCUC, the difference between (1) and (2) is calculated and stored. Since there are not always good targets and the mean value could become rather high, the median of these differences is found, and p is that median divided by the largest of the (1)-(2) differences. The value of p is also used in condition 1, above.

The optimal CART training samples and nonoptimal CART training samples are used to train the CART. The CART is created by asking a series of question for features and samples. Numerous references are available regarding techniques for use in CART building validation. Validating attempts to avoid overfitting. In at least one embodiment, tree functions of the MATLAB programming language are used to validate the CART with 10-fold cross-validation (i.e., a training set is randomly divided into 10 disjoint sets and the CART is trained 10 times; each time a different set is left out to act as a validation set). A validation error gives an estimate of what kind of performance can be expected. The training of a CART seeks to find which features are important in the final candidate selection. There can be many contours very similar to a SCUC (here SCUC refers to a SCUC in the process of FIGS. 4A and 4B), and thus finding out how much duration and context affect the result can be important. In the CART training, a CART tree with gini impurity measure can be used and the splitting minimum is set at 2% of the CART training data. The CART can be pruned according to the results of 10-fold cross-validation in order to prevent over-fitting and terminal nodes having less than 0.5% of the training samples are pruned.

In embodiments which employ equation 5 in block 123, the weight vector W can be found using an LMS algorithm or a perceptron network with a fixed number of iterations.

Although the above discussion concentrates on conversion of the pitch prosody component, the invention is not limited in this regard. For example, the techniques described above can also be used for energy contours. A listener perceives speech energy as loudness. In some applications, replicating a target voice energy contour is less important to a convincing conversion than is replication of a target voice pitch contour. In many cases, energy is very susceptible to variation based on conditions other than a target voice (e.g., distance of a speaking person from a microphone). For some voices, however, energy contour may be more important during voice conversion. In such cases, a codebook can also include transformed representations of energy contours for source and target voice versions of the codebook training material. Using that energy data in the codebook, energy contours for syllables of a source passage can be converted using the same techniques described above for pitch contours.

The duration prosodic component can be converted in various manners. As indicated above, a codebook in at least some embodiments includes data for the duration of the source and target versions of each training material syllable. This data (over all training material syllables) can be used to determine a scaling ratio between source and target speakers. For example, a regression line (y=ax+b) can be fit through all source and respective target durations in the codebook. Target duration could then be predicted using the regression coefficients. This scaling ratio can be applied to the output target pitch contour (e.g., prior to storage in block 137 of FIG. 4B) on a syllable-by-syllable basis. The codebook target duration data could also be used more directly by not scaling, e.g., allowing the generated target pitch contour to have the same duration $d_j^{TGT}$ as the codebook index chosen for creating the target pitch contour. As yet another alternative, sentence-level (or other multi-syllable-level) curve fitting could be used. In other words, the tempo at which syllables are spoken in the source passage can be mapped, using first-order polynomial regression, to a tempo at which syllables were spoken in the target voice version of the codebook training material. The tempo data for the target voice version of the training material could be separately calculated as the target speaker utters multiple training material syllables, and this tempo data separately stored in the codebook or elsewhere. These duration conversion techniques can also be combined. For example, syllable-level durations can be scaled or based on target durations for training material syllables, with sentence level durations based on target voice tempo.

In some cases, durations are better modeled in the logarithmic domain. Under such circumstances, the above described duration predicting techniques can be used in the logarithmic domain.

Although specific examples of carrying out the invention have been described, those skilled in the art will appreciate that there are numerous variations and permutations of the above-described systems and methods that are contained within the spirit and scope of the invention as set forth in the appended claims. Examples of such variations include, but are not limited to, the following:

- The invention may also be implemented as a machine-readable medium (e.g., RAM, ROM, a separate flash memory, etc.) having machine-executable instructions stored thereon such that, when the instructions are read and executed by an appropriate device (or devices), steps of a method according to the invention are performed.
- Processing need not be performed at the syllable level. If the syllabification information is missing, for example, processing may be performed separately for every voiced contour that is present in a source waveform. A codebook can also be built on the basis of every voiced contour in source and target versions of training material (e.g., if the voice conversion is done without a TTS system).

Initial selection from the codebook can be based on duration information. For example, the voiced contour duration information for a source passage segment can be compared to source duration data in the codebook, and a set of candidates chosen based on durations that are a sufficiently close match. One or more of the candidates could then be selected using distances between the linguistic feature values for the contour of the source passage segment and the linguistic feature values for the candidates. This could also be reversed, i.e., initial selection based on linguistic features and final selection based on duration.

If there is enough data available during codebook generation, bias levels of the contours can be taken into account. In other words, the first DCT coefficient could also be included in the codebook. In this and other scenarios, the continuity of the resulting contour could be ensured using techniques other than the one presented above in connection with block 135 of FIG. 4B. However, adding bias to preserve continuity is not mandatory. The appropriateness of adding a bias can be detected from the source contour. If the last F0 point of source passage syllable k is very close in time to the first F0 point of source passage syllable k+1 and they seem continuous in F0 (the F0 difference between the two is small), bias could be added. However, this bias adjustment may change F0 level of the syllable, and other techniques (e.g., using some number of points in the boundary as smoothing points and connecting the syllable F0 contours together using that smoothing) could be used. In some cases, adding a bias value to maintain continuity across the boundaries of two converted contours (e.g., adding a bias value to syllable k+1 of adjacent syllables k and k+1) can cause significant changes in the standard deviation of pitch when that standard deviation is calculated for the two contours together. In such a case, the pitch can be scaled back to its previous level and the F0 level reset for the two syllables based on a calculation for the two syllables together. In some cases continuity of a syllable can be determined by the time difference of the F0 measurements in the syllable boundary and from the source F0 difference in the boundary.

Transforms other than a discrete cosine transform can be used. For example, a DFT (discrete Fourier transform), an FFT (fast Fourier transform) or DST (discrete sine transform) could be used. All permit zero-padding possibilities. In some cases a DCT may be more convenient as compared to a DFT, as a DCT allows representation using only a few coefficients.

The order of various operations could be changed. For example, the candidate codebook indices could first be identified based on linguistic features, with final selection based on similarity between $X_i^{SRC}$ and $Z_j^{SRC}$.

Alternate processing other than mean-value processing could be employed.

Use of linguistic feature data can be omitted.

These and other modifications are within the scope of the invention as set forth in the attached claims. In the claims, various portions are prefaced with letter or number references for convenience. However, use of such references does not imply a temporal relationship not otherwise required by the language of the claims.

The invention claimed is:

1. A method comprising:

(a) receiving data for a plurality of segments of a passage in a source voice, wherein the data for each segment of the plurality models a prosodic component of the source voice for that segment;

(b) identifying a target voice entry in a codebook for each of the source voice passage segments, wherein each of the identified target voice entries models a prosodic component of a target voice for a different segment of codebook training material; and (c) generating, in one or more processors, a target voice version of the plurality of passage segments by altering the modeled source voice prosodic component for each segment to replicate the target voice prosodic component modeled by the target voice entry identified for that segment in (b), and wherein the codebook includes multiple source voice entries, each of the multiple source voice entries models a prosodic component of the source voice for a different segment of the codebook training material, each of the multiple source voice entries corresponds to a target voice entry modeling a prosodic component of the target voice for the segment of the codebook training material for which the corresponding source voice entry models the prosodic component of the source voice, operation (b) includes, for each source voice passage segment, identifying a target voice entry by comparing data for the source voice passage segment to one or more of the multiple source voice entries, each of the multiple source voice entries and its corresponding target voice entry includes a plurality of transform coefficients representing a contour for the modeled prosodic component, and operation (b) includes, for each source voice passage segment, identifying a target voice entry by comparing transform coefficients representing a contour for the prosodic component of the source voice passage segment to the transform coefficients for one or more of the multiple source voice entries.

2. The method of claim 1, wherein operation (a) includes receiving data for one or more additional segments of the passage in a source voice, and wherein the method further comprises:

(d) generating a target voice version of each of the one or more additional source voice passage segments according to $$x_i(n)|_{MV} = \frac{x_i^{SRC}(n) - \mu_{SRC}}{\sigma_{SRC}} * \sigma_{TGT} + \mu_{TGT}$$

wherein $\mu_{SRC}$ is a mean of all F0 values for source voice versions of segments in the codebook training material, $\sigma_{SRC}$ is a standard deviation of all F0 values for source voice versions of segments in the codebook training material, $\mu_{TGT}$ is a mean of all F0 values for target voice versions of segments in the codebook training material, $\sigma_{TGT}$ is a standard deviation of all F0 values for target voice versions of segments in the codebook training material, $x_i^{SRC}(n)$ is a value for F0 at time n in an F0 contour for segment i of the additional segments, and $x_i(n)|_{MV}$ is a value for F0 at time n in an F0 contour for a target voice version of segment i of the additional segments.

3. The method of claim 1, wherein each of the multiple source voice entries is associated with a different feature vector, each of the associated feature vectors includes values of a set of linguistic features for the codebook training speech segment for which the associated source voice entry models the prosodic component of the source voice, data for each of the source voice passage segments includes a feature vector that includes values of the set of linguistic features for that source voice passage segment, and operation (b) includes, for each source voice passage segment, (b1) identifying multiple candidate source voice entries based the transform coefficient comparisons; and (b2) selecting the identified target voice entry based on a comparison of the feature vector for the source voice passage segment with each of the feature vectors associated with the multiple candidate source voice entries identified in (b1).

4. The method of claim 3, wherein the selecting in operation (b2) is also based on comparison of a duration of the source voice passage segment with durations of each of the candidate source voice entries identified in (b1).

5. The method of claim 1, wherein the codebook training material is substantially different from the passage.

6. A non-transitory machine-readable medium storing machine-executable instructions for performing a method comprising:

(a) receiving data for a plurality of segments of a passage in a source voice, wherein the data for each segment of the plurality models a prosodic component of the source voice for that segment;

(b) identifying a target voice entry in a codebook for each of the source voice passage segments, wherein each of the identified target voice entries models a prosodic component of a target voice for a different segment of codebook training material; and (c) generating a target voice version of the plurality of passage segments by altering the modeled source voice prosodic component for each segment to replicate the target voice prosodic component modeled by the target voice entry identified for that segment in (b), and wherein the codebook includes multiple source voice entries, each of the multiple source voice entries models a prosodic component of the source voice for a different segment of the codebook training material, each of the multiple source voice entries corresponds to a target voice entry modeling a prosodic component of the target voice for the segment of the codebook training material for which the corresponding source voice entry models the prosodic component of the source voice, operation (b) includes, for each source voice passage segment, identifying a target voice entry by comparing data for the source voice passage segment to one or more of the multiple source voice entries, each of the multiple source voice entries and its corresponding target voice entry includes a plurality of transform coefficients representing a contour for the modeled prosodic component, and operation (b) includes, for each source voice passage segment, identifying a target voice entry by comparing transform coefficients representing a contour for the prosodic component of the source voice passage segment to the transform coefficients for one or more of the multiple source voice entries.

7. The non-transitory machine-readable medium of claim 6, wherein operation (a) includes receiving data for one or more additional segments of the passage in a source voice, and storing additional machine-executable instructions for:

(d) generating a target voice version of each of the one or more additional source voice passage segments according to $$x_i(n)|_{MV} = \frac{x_i^{SRC}(n) - \mu_{SRC}}{\sigma_{SRC}} * \sigma_{TGT} + \mu_{TGT}$$

wherein $\mu_{SRC}$ is a mean of all F0 values for source voice versions of segments in the codebook training material, $\sigma_{SRC}$ is a standard deviation of all F0 values for source voice versions of segments in the codebook training material, $\mu_{TGT}$ is a mean of all F0 values for target voice versions of segments in the codebook training material, $\sigma_{TGT}$ is a standard deviation of all F0 values for target voice versions of segments in the codebook training material, $x_i^{SRC}(n)$ is a value for F0 at time n in an F0 contour for segment i of the additional segments, and $x_i(n)|_{MV}$ is a value for F0 at time n in an F0 contour for a target voice version of segment i of the additional segments.

8. The non-transitory machine-readable medium of claim 7, wherein the data for the passage segments in the source voice is generated by a text-to-speech system.

9. The non-transitory machine-readable medium of claim 6, wherein the modeled prosodic components are pitch contours.

10. The non-transitory machine-readable medium of claim 6, wherein the transform is a discrete cosine transform.

11. The non-transitory machine-readable medium of claim 6, wherein each of the multiple source voice entries is associated with a different feature vector, each of the associated feature vectors includes values of a set of linguistic features for the codebook training speech segment for which the associated source voice entry models the prosodic component of the source voice, data for each of the source voice passage segments includes a feature vector that includes values of the set of linguistic features for that source voice passage segment, and operation (b) includes, for each source voice passage segment, (b1) identifying multiple candidate source voice entries based the transform coefficient comparisons, and (b2) selecting the identified target voice entry based on a comparison of the feature vector for the source voice passage segment with each of the feature vectors associated with the multiple candidate source voice entries identified in (b1).

12. The non-transitory machine-readable medium of claim 11, wherein the selecting in operation (b2) is also based on comparison of a duration of the source voice passage segment with durations of each of the candidate source voice entries identified in (b1).

13. The non-transitory machine-readable medium of claim 6, wherein operation (c) includes, (c1) performing an inverse transform on the target voice entry identified for one of the source voice passage segments, (c2) adjusting the result of (c1) according to $$x_i^{TGT}(n)|_a = x_i^{TGT}(n) + x_i^{SRC}(n) - z_j^{SRC}(n),$$

wherein $x_i^{TGT}(n)$ is a value for pitch at time n and is the result of (c1), $x_i^{SRC}(n)$ is a value for pitch at time n from a pitch contour for the source voice passage segment for which the inverse transform was performed in (c1), $z_j^{SRC}(n)$ is a value for pitch at time n obtained from the inverse transform of the source voice entry corresponding to the identified target voice entry of (c1), and $x_i^{TGT}(n)|_a$ is an adjusted pitch value at time n.

14. The non-transitory machine-readable medium of claim 13, wherein operation (c) includes (c3) further adjusting the result of (c2) according to $$x_i^{TGT}(n)|_{a,\mu} = x_i^{TGT}(n)|_a + x_i(n)|_{MV},$$

wherein $$x_i(n)|_{MV} = \frac{x_i^{SRC}(n) - \mu_{SRC}}{\sigma_{SRC}} * \sigma_{TGT} + \mu_{TGT}$$

and wherein $\mu_{SRC}$ is a mean of all F0 values for source voice versions of segments in the codebook training material, $\sigma_{SRC}$ is a standard deviation of all F0 values for source voice versions of segments in the codebook training material, $\mu_{TGT}$ is a mean of all F0 values for target voice versions of segments in the codebook training material, and $\sigma_{TGT}$ is a standard deviation of all F0 values for target voice versions of segments in the codebook training material.

15. The non-transitory machine-readable medium of claim 14, wherein operation (c) includes (c4) determining whether a boundary between the source voice passage segment for which the inverse transform was performed in (c1) and an adjacent source voice passage segment is continuous in voicing energy level, and (c5) upon determining in (c4) that the boundary is continuous in voicing energy level, adding a bias value to the result of (c3) to preserve a continuous pitch level.

16. The non-transitory machine-readable medium of claim 6, wherein the codebook training material is substantially different from the passage.

17. A device, comprising:

at least one processor; and at least one memory storing machine executable instructions, the machine-executable instructions configured to, with the at least one processor, cause the device to (a) receive data for a plurality of segments of a passage in a source voice, wherein the data for each segment of the plurality models a prosodic component of the source voice for that segment, (b) identify a target voice entry in a codebook for each of the source voice passage segments, wherein each of the identified target voice entries models a prosodic component of a target voice for a different segment of codebook training material, and (c) generate a target voice version of the plurality of passage segments by altering the modeled source voice prosodic component for each segment to replicate the target voice prosodic component modeled by the target voice entry identified for that segment in (b), and wherein the codebook includes multiple source voice entries, each of the multiple source voice entries models a prosodic component of the source voice for a different segment of the codebook training material, each of the multiple source voice entries corresponds to a target voice entry modeling a prosodic component of the target voice for the segment of the codebook training material for which the corresponding source voice entry models the prosodic component of the source voice, operation (b) includes, for each source voice passage segment, identifying a target voice entry by comparing data for the source voice passage segment to one or more of the multiple source voice entries, each of the multiple source voice entries and its corresponding target voice entry includes a plurality of transform coefficients representing a contour for the modeled prosodic component, and operation (b) includes, for each source voice passage segment, identifying a target voice entry by comparing transform coefficients representing a contour for the prosodic component of the source voice passage segment to the transform coefficients for one or more of the multiple source voice entries.

18. The device of claim 17, wherein operation (a) includes receiving data for one or more additional segments of the passage in a source voice, and wherein the one or more processors are configured to generate a target voice version of each of the one or more additional source voice passage segments according to $$x_i(n)|_{MV} = \frac{x_i^{SRC}(n) - \mu_{SRC}}{\sigma_{SRC}} * \sigma_{TGT} + \mu_{TGT}$$

wherein $\mu_{SRC}$ is a mean of all F0 values for source voice versions of segments in the codebook training material, $\sigma_{SRC}$ is a standard deviation of all F0 values for source voice versions of segments in the codebook training material, $\mu_{TGT}$ is a mean of all F0 values for target voice versions of segments in the codebook training material, $\sigma_{TGT}$ is a standard deviation of all F0 values for target voice versions of segments in the codebook training material, $x_i^{SRC}(n)$ is a value for F0 at time n in an F0 contour for segment i of the additional segments, and $x_i(n)|_{MV}$ is a value for F0 at time n in an F0 contour for a target voice version of segment i of the additional segments.

19. The device of claim 18, wherein the data for the passage segments in the source voice is generated by a text-to-speech system.

20. The device of claim 17, wherein the modeled prosodic components are pitch contours.

21. The device of claim 17, wherein the transform is a discrete cosine transform.

22. The device of claim 17, wherein each of the multiple source voice entries is associated with a different feature vector, each of the associated feature vectors includes values of a set of linguistic features for the codebook training speech segment for which the associated source voice entry models the prosodic component of the source voice, data for each of the source voice passage segments includes a feature vector that includes values of the set of linguistic features for that source voice passage segment, and operation (b) includes, for each source voice passage segment, (b1) identifying multiple candidate source voice entries based the transform coefficient comparisons, and (b2) selecting the identified target voice entry based on a comparison of the feature vector for the source voice passage segment with each of the feature vectors associated with the multiple candidate source voice entries identified in (b1).

23. The device of claim 22, wherein the selecting in operation (b2) is also based on comparison of a duration of the source voice passage segment with durations of each of the candidate source voice entries identified in (b1).

24. The device of claim 17, wherein operation (c) includes, (c1) performing an inverse transform on the target voice entry identified for one of the source voice passage segments, (c2) adjusting the result of (c1) according to $$x_i^{TGT}(n)|_a = x_i^{TGT}(n) + x_i^{SRC}(n) - z_j^{SRC}(n),$$

wherein $x_i^{TGT}(n)$ is a value for pitch at time n and is the result of (c1), $x_i^{SRC}(n)$ is a value for pitch at time n from a pitch contour for the source voice passage segment for which the inverse transform was performed in (c1), $z_j^{SRC}(n)$ is a value for pitch at time n obtained from the inverse transform of the source voice entry corresponding to the identified target voice entry of (c1), and $x_i^{TGT}(n)|_a$ is an adjusted pitch value at time n.

25. The device of claim 24, wherein operation (c) includes (c3) further adjusting the result of (c2) according to $$x_i^{TGT}(n)|_{a,\mu} = x_i^{TGT}(n)|_a + x_i(n)|_{MV},$$

wherein $$x_i(n)|_{MV} = \frac{x_i^{SRC}(n) - \mu_{SRC}}{\sigma_{SRC}} * \sigma_{TGT} + \mu_{TGT}$$

and wherein $\mu_{SRC}$ is a mean of all F0 values for source voice versions of segments in the codebook training material, $\sigma_{SRC}$ is a standard deviation of all F0 values for source voice versions of segments in the codebook training material, $\mu_{TGT}$ is a mean of all F0 values for target voice versions of segments in the codebook training material, and $\sigma_{TGT}$ is a standard deviation of all F0 values for target voice versions of segments in the codebook training material.

26. The device of claim 25, wherein operation (c) includes (c4) determining whether a boundary between the source voice passage segment for which the inverse transform was performed in (c1) and an adjacent source voice passage segment is continuous in voicing energy level, and (c5) upon determining in (c4) that the boundary is continuous in voicing energy level, adding a bias value to the result of (c3) to preserve a continuous pitch level.

27. The device of claim 17, wherein the device is a mobile communication device.

28. The device of claim 17, wherein the device is a computer.

29. The device of claim 17, wherein the codebook training material is substantially different from the passage.

30. A device, comprising:

a voice converter, the voice converter including means for receiving data for a plurality of segments of a passage in a source voice, means for identifying target voice data entries in a codebook for segments of the source voice passage, and means for generating a target voice version of the passage segments based on identified target voice data entries, and wherein the codebook includes multiple source voice entries, each of the multiple source voice entries models a prosodic component of the source voice for a different segment of the codebook training material, each of the multiple source voice entries corresponds to a target voice entry modeling a prosodic component of the target voice for the segment of the codebook training material for which the corresponding source voice entry models the prosodic component of the source voice, the identification means include means for comparing data for the source voice passage segment to one or more of the multiple source voice entries, each of the multiple source voice entries and its corresponding target voice entry includes a plurality of transform coefficients representing a contour for the modeled prosodic component, and the identification means further include means for comparing transform coefficients representing a contour for the prosodic component of the source voice passage segment to the transform coefficients for one or more of the multiple source voice entries.

31. The device of claim 30, wherein the identification means include means for comparing feature vectors of source passage segments to feature vectors of codebook training material segments.

* * * * *